United States Patent
Zhang-Beglinger et al.

(10) Patent No.: US 9,114,594 B2
(45) Date of Patent: Aug. 25, 2015

(54) HIGH TEMPERATURE RESISTANT SILVER COATED SUBSTRATES

(75) Inventors: Wan Zhang-Beglinger, Adligenswil (CH); Margit Clauss, Kriens (CH); Michael P. Toben, Smithtown, NY (US)

(73) Assignee: Rohm and Haas Electronic Materials LLC

( * ) Notice: Subject to any disclaimer, the term of this patent is extended or adjusted under 35 U.S.C. 154(b) by 0 days.

(21) Appl. No.: 13/559,551

(22) Filed: Jul. 26, 2012

(65) Prior Publication Data

US 2013/0196174 A1    Aug. 1, 2013

Related U.S. Application Data

(60) Provisional application No. 61/511,871, filed on Jul. 26, 2011.

(51) Int. Cl.
| | |
|---|---|
| *H01L 29/40* | (2006.01) |
| *B32B 15/01* | (2006.01) |
| *C25D 3/46* | (2006.01) |
| *C25D 5/12* | (2006.01) |
| *C23C 28/02* | (2006.01) |
| *C22C 5/06* | (2006.01) |
| *C22C 9/04* | (2006.01) |
| *C23C 18/16* | (2006.01) |
| *C25D 3/12* | (2006.01) |
| *C25D 3/30* | (2006.01) |
| *C25D 3/32* | (2006.01) |
| *C25D 3/56* | (2006.01) |
| *C25D 3/60* | (2006.01) |

(Continued)

(52) U.S. Cl.
CPC ................ *B32B 15/018* (2013.01); *C22C 5/06* (2013.01); *C22C 9/04* (2013.01); *C23C 28/023* (2013.01); *C25D 3/46* (2013.01); *C25D 5/12* (2013.01); *C23C 18/1644* (2013.01); *C23C 18/1651* (2013.01); *C23C 18/1653* (2013.01); *C23C 18/1671* (2013.01); *C23C 18/34* (2013.01); *C23C 18/36* (2013.01); *C23C 18/48* (2013.01); *C23C 18/52* (2013.01); *C25D 3/12* (2013.01); *C25D 3/30* (2013.01); *C25D 3/32* (2013.01); *C25D 3/562* (2013.01); *C25D 3/60* (2013.01); *Y10T 428/12715* (2015.01)

(58) Field of Classification Search
USPC .......................................... 257/779, 780, 781
See application file for complete search history.

(56) References Cited

U.S. PATENT DOCUMENTS

| | | | |
|---|---|---|---|
| 6,669,077 B1 * | 12/2003 | Kawashima et al. | .... 228/180.21 |
| 6,717,059 B2 * | 4/2004 | Shintani et al. | ............... 174/251 |

(Continued)

FOREIGN PATENT DOCUMENTS

| | | |
|---|---|---|
| EP | 1 256 981 A1 | 11/2002 |
| EP | 1 257 004 A1 | 11/2002 |

(Continued)

OTHER PUBLICATIONS

European Search Report of corresponding European Application No. 12 17 7759 mailed Nov. 15, 2012.

(Continued)

*Primary Examiner* — Cathy Lam (57) ABSTRACT

A thin film of tin is plated directly on nickel coating a metal substrate followed by plating silver directly on the thin film of tin. The silver has good adhesion to the substrate even at high temperatures.

5 Claims, 5 Drawing Sheets

(51) Int. Cl.
    C23C 18/34    (2006.01)
    C23C 18/36    (2006.01)
    C23C 18/48    (2006.01)
    C23C 18/52    (2006.01)

(56) References Cited

U.S. PATENT DOCUMENTS

| | | | |
|---|---|---|---|
| 6,755,958 B2 | 6/2004 | Datta | |
| 6,919,137 B2 * | 7/2005 | Kawashima et al. | 428/617 |
| 7,122,894 B2 * | 10/2006 | Sugimoto et al. | 257/737 |
| 7,132,020 B2 * | 11/2006 | Nozawa et al. | 148/400 |
| 7,405,484 B2 * | 7/2008 | Usui et al. | 257/776 |
| 7,615,255 B2 * | 11/2009 | Lau et al. | 427/383.7 |
| 7,786,599 B2 * | 8/2010 | Amagai | 257/779 |
| 7,800,240 B2 * | 9/2010 | Yu | 257/781 |
| 7,824,776 B2 * | 11/2010 | Yoshida et al. | 428/647 |
| 7,893,544 B2 * | 2/2011 | Ano | 257/781 |
| 7,915,741 B2 * | 3/2011 | Lau et al. | 257/780 |
| 8,013,428 B2 * | 9/2011 | Hooghan et al. | 257/666 |
| 2003/0091855 A1 * | 5/2003 | Tanaka et al. | 428/647 |
| 2005/0048308 A1 * | 3/2005 | Mucklich et al. | 428/614 |
| 2007/0054138 A1 | 3/2007 | Lau et al. | |
| 2009/0176125 A1 | 7/2009 | Hatano | |
| 2010/0186993 A1 | 7/2010 | Yamaguchi et al. | |
| 2011/0079814 A1 | 4/2011 | Chen | |
| 2011/0214851 A1 | 9/2011 | Chen et al. | |

FOREIGN PATENT DOCUMENTS

| | | |
|---|---|---|
| EP | 2 139 012 A1 | 12/2009 |
| EP | 2 330 872 A1 | 6/2011 |
| JP | 51-35635 | 3/1976 |
| JP | S58221291 A | 12/1983 |
| JP | 2003-293170 | 10/2003 |
| JP | 2009-010407 | 1/2009 |
| JP | 2010-074151 | 4/2010 |
| WO | WO 01/72508 A1 | 10/2001 |
| WO | WO 02/49077 A2 | 6/2002 |

OTHER PUBLICATIONS

Taiwan Search Report of corresponding Taiwan Application No. 101126746; Completion of search dated Mar. 19, 2014.

* cited by examiner

HIGH TEMPERATURE RESISTANT SILVER COATED SUBSTRATES

This application claims the benefit of priority under 35 U.S.C. §119(e) to U.S. Provisional Application No. 61/511,871, filed Jul. 26, 2011, the entire contents of which application are incorporated herein by reference.

The present invention is directed to high temperature resistant silver coated substrates containing copper. More specifically, the present invention is directed to high temperature resistant silver coated substrates containing copper with improved adhesion of the silver coatings to the copper containing substrates.

Electroplated and electrolessly plated silver coatings have been used in various applications, such as in the manufacture of electrical connectors, printed circuit boards, light emitting diodes, plating on plastics and on decorative articles due to the excellent deposit properties of silver. When silver is plated on substrates which include copper or copper alloys, a nickel underlayer is typically applied to the copper or copper alloy prior to silver plating. The nickel acts as a barrier to prevent copper diffusion into silver and also can provide an improved surface morphology. In order to achieve an adhesive silver layer over nickel, a thin silver strike layer is typically applied to the nickel prior to plating a final and thicker silver coating. As long as the plating processes are properly done, no adhesion failure between nickel and silver typically occurs shortly after plating or during the service lifetime of the component.

There has recently been increased interest by different industries to use silver coatings for high temperature applications, typically at temperatures above 150° C. At such high temperatures the use of a nickel barrier layer is essential because of rapid copper diffusion. In addition under such high temperature conditions, oxidation of nickel underneath the silver can readily occur resulting in adhesion failure between the nickel and the silver. The phenomenon of accelerated oxidation of the nickel under silver at high temperatures is not yet fully understood. In general, typical methods used to enhance the silver adhesion to nickel, such as silver strike and nickel surface activation have not been able to overcome the oxidation and adhesion problem at high temperature applications.

Japanese patent application publication JP 2003-293170 to Mitsubishi Materials Corp. discloses a high temperature electric conductor, such as a current extraction terminal for fuel cells, which may be used in high temperature environments. The conductor base material may be an iron, nickel or cobalt alloy. A nickel layer is plated on the conductor base material followed by plating silver on the nickel. The patent publication discloses that the conductor does not oxidize in high temperature atmospheres of 500-960° C. and maintains electrical continuity. Although there are articles having base material of iron, nickel, or cobalt alloys with silver and nickel layers where the nickel does not oxidize in high temperature environments, there is still a need for articles containing silver on nickel which can withstand high temperature applications on base materials which include copper or copper alloys.

Articles include a substrate containing copper or copper alloy, a nickel containing layer adjacent the copper or copper alloy containing substrate, a tin containing layer adjacent the nickel containing layer and a silver layer adjacent the tin containing layer, the silver layer is at least twice the thickness of the tin containing layer.

Methods include providing a substrate containing copper or copper alloy; depositing a nickel containing layer adjacent the copper or copper alloy containing substrate; depositing a tin containing layer adjacent the nickel containing layer; and depositing a silver layer adjacent the tin containing layer, the silver layer is at least twice the thickness of the tin containing layer.

Application of a thin film of tin or tin alloy adjacent nickel or nickel alloy prior to depositing silver inhibits oxidation of the nickel containing layer thus inhibiting adhesion failure between the silver and the copper or copper alloy containing substrate during high temperature applications. Accordingly, the articles may be used in high temperature environments with minimal concern for adhesion failure of the silver layer.

As used throughout this specification, the terms "depositing" and "plating" are used interchangeably. The terms "composition" and "bath" are used interchangeably. The term "adjacent" means adjoin or next to and joined with. The indefinite articles "a" and "an" are intended to include both the singular and the plural. The following abbreviations have the following meanings unless the context clearly indicates otherwise: ° C.=degrees Celsius; g=grams; ml=milliliter; L=liter; ASD=A/dm$^2$=amperes/decimeter squared; PVD=physical vapor deposition; CVD=chemical vapor deposition; PCB=printed circuit board or printed wiring board; SEM=scanning electron micrograph; EDX=EDS=energy-dispersive X-ray spectroscopy; cm=centimeter; μm=microns; nm=nanometers.

All percentages and ratios are by weight unless otherwise indicated. All ranges are inclusive and combinable in any order except where it is logical that such numerical ranges are constrained to add up to 100%.

Figure 1:
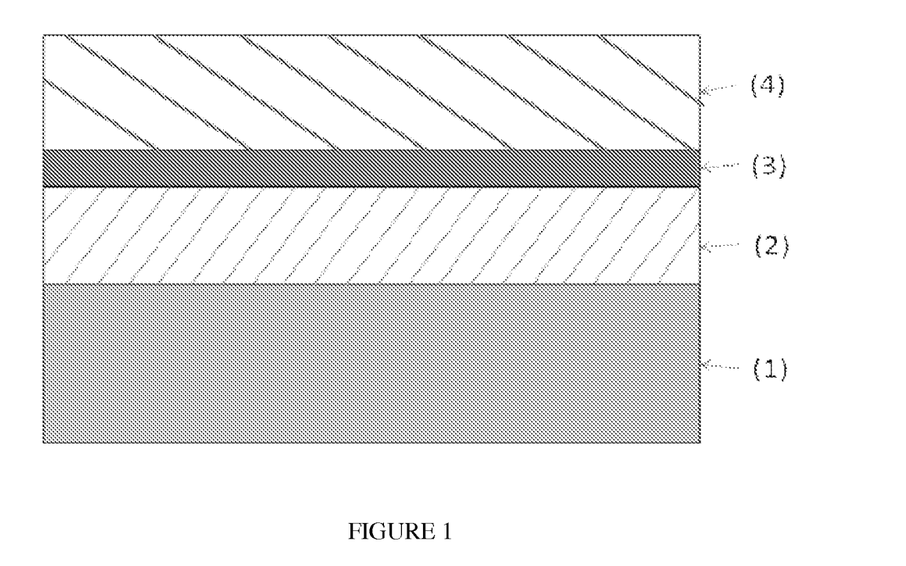
FIG. 1 is an illustration of a cross-section of an article with a silver layer on a tin strike layer on a nickel barrier layer on a copper based substrate.

Articles may be represented by FIG. 1 which shows a copper containing substrate 1, with a nickel containing barrier layer 2, adjacent the copper based substrate. A tin containing strike layer 3 is adjacent the nickel containing barrier layer, and a silver layer 4 having at least twice the thickness of the tin containing strike layer is adjacent the tin containing strike layer. Optionally, the top silver layer may have an anti-tarnish layer (not shown). The articles may be used as components in various electronic devices, such as those devices where the article may be exposed to temperatures of 150° C. and higher or such as from 200° C. to 600° C. and still retain good adhesion between the metal layers.

One or more layers of nickel or nickel alloy are deposited on a substrate which includes copper. The nickel functions as a barrier layer to inhibit copper diffusion into a silver top layer. The substrate may be substantially all copper or may include one or more copper alloys such as, but not limited to, tin/copper, silver/copper, gold/copper, copper/bismuth, copper/zinc, copper/nickel, tin/silver/copper and tin/copper/bismuth. The substrate may be a PCB or dielectric material, such as a plastic or resin material, with a copper or cooper alloy layer. The nickel or nickel alloy is deposited such that the layers are adjacent a surface of the copper or copper alloy layer of the substrate to form an interface with the copper or copper alloy surface of the substrate. In general, the nickel or nickel alloy layers are at least 0.5 µm thick. Preferably, the nickel or nickel alloy layers are 0.5 µm to 10 µm thick, more preferably 1 µm to 5 µm thick. The one or more nickel or nickel alloy layers may be deposited by conventional methods used in the art to deposit nickel or nickel alloys on a substrate. Such methods include, but are not limited to, PVD, CVD, electrolytic and electroless metal plating. Such methods are well known in the art and literature. Preferably, electrolytic metal plating is used to deposit the nickel or nickel alloy on the copper containing substrate.

In general, nickel or nickel alloy electroplating may be done at a current density of at least 0.01 ASD. Typical current densities are from 0.1 ASD to 5 ASD, more typically from 0.5 ASD to 2 ASD. Minor experimentation may be used to tailor the current density for a particular substrate. The electroplating processes used are conventional.

Nickel ions in the plating compositions may be provided by using any suitable solution-soluble nickel compound, typically a water soluble nickel salt. Such nickel compounds include, but are not limited to, nickel sulfate, nickel chloride, nickel sulfamate, and nickel phosphate. Mixtures of nickel compounds may be used in the plating compositions. Such mixtures may be metal compounds having the same metal but being different compounds, such as a mixture of nickel sulfate and nickel chloride. The nickel compounds are added to the plating compositions in an amount sufficient to provide a nickel ion concentration in the plating composition of 0.1 g/L to 150 g/L, typically from 0.5 g/L to 100 g/L, and more typically from 1 g/L to 70 g/L.

Any of a wide variety of electrolytes may be used in the nickel plating compositions, including acids and bases. Electrolytes include, without limitation, alkane sulfonic acids such as methane sulfonic acid, ethane sulfonic acid and propane sulfonic acid; alkylol sulfonic acids; aryl sulfonic acids such as toluene sulfonic acid, phenyl sulfonic acid and phenol sulfonic acid; amino-containing sulfonic acids such as amido sulfonic acid; sulfamic acid; mineral acids; carboxylic acids such as formic acid and haloacetic acids; hydrogen halide acids; and pyrophosphate. Salts of acids and bases also may be used as the electrolyte. Further, the electrolyte may contain a mixture of acids, a mixture of bases or a mixture of one or more acids with one or more bases. Such electrolytes are generally commercially available from a variety of sources, such as Aldrich Chemical Company, Milwaukee, Wis.

Optionally a wide variety of surfactants may be used in the nickel plating compositions. Any of anionic, cationic, amphoteric and nonionic surfactants may be used as long as it does not interfere with the performance of the nickel plating. Surfactants may be included in conventional amounts, such are well known in the art.

Optionally, the nickel plating compositions may contain one or more additional components. Such additional components include, without limitation, brighteners, grain refiners and ductility enhancers. Such additional components are well known in the art and are used in conventional amounts.

The nickel plating composition may optionally contain a buffering agent. Exemplary buffering agents include, but are not limited to, borate buffer (such as borax), phosphate buffer, citrate buffer, carbonate buffer, and hydroxide buffer. The amount of the buffer used is that amount sufficient to maintain the pH of the plating composition at a desired level, such amount being well known to those skilled in the art.

One or more alloying metals may be included in the nickel plating compositions. Such alloying metals include without limitation tin, copper and bismuth. Nickel-phosphorus is a preferred alloy. Such metals are provided as their solution soluble salts which are well known in the art. Conventional amounts may be included in the nickel plating compositions to provide a nickel alloy deposit.

Suitable electrolytic nickel plating baths are commercially available as well as many which are disclosed in the literature. Examples of commercially available electrolytic nickel baths are the NICKEL GLEAM™ Electrolytic Nickel products and NIKAL™ SC Electrolytic Nickel products both obtainable from Rohm and Haas Electronic Materials, LLC, Marlborough, Mass., U.S.A. Other examples of suitable electrolytic nickel plating baths are the Watts-type baths disclosed in U.S. Pat. No. 3,041,255.

Electroless nickel plating compositions may or may not include a reducing agent. Typically, the electroless nickel plating compositions do include a reducing agent. Such reducing agents include, but are not limited to, sodium hypophosphite, potassium hypophosphite, thiourea and thiourea derivatives, hydantoin and hydantoin derivatives, hydroquinone and hydroquinone derivatives, resorcinol, and formaldehyde and formaldehyde derivatives, DEA (n-diethylamine borane), sodium borohydride and hydrazine. Such reducing agents may be used in conventional amounts such as from 0.1 g/L to 40 g/L. Examples of commercially available electroless nickel compositions include DURAPOSIT™ SMT 88 Electroless Nickel and NIPOSIT™ PM 980 and PM 988 Electroless Nickel. All are available from Rohm and Haas Electronic Materials, LLC.

Nickel plating compositions may have a pH in the range of 1 to 14, typically from 1 to 12, more typically from 1-8. The working temperature of the nickel plating compositions during plating may be from 10° C. to 100° C., or such as from 20° C. to 50° C.

Subsequent to nickel or nickel alloy deposition one or more tin or tin alloy strike layers are deposited adjacent to the one or more nickel or nickel alloy layers. Tin or tin alloy may be deposited by conventional methods used in the art, such as electrolytic, electroless or immersion tin or tin alloy plating. Preferably tin or tin alloy is electroplated or electrolessly plated adjacent the nickel or nickel alloy. More preferably tin or tin alloy is electroplated adjacent the nickel or nickel alloy layer. The tin or tin alloy layers have a thickness of at least 0.01 µm, preferably 0.01 µm to 2 µm, more preferably from 0.1 µm to 1 µm.

Suitable tin and tin alloy plating baths may be acidic or alkaline. An exemplary acidic tin bath contains one or more solution soluble tin compounds, one or more acidic electrolytes, and optionally one or more additives. Suitable tin compounds include, but are not limited to salts, such as tin halides, tin sulfates, tin alkane sulfonate such as tin methane sulfonate, tin aryl sulfonate such as tin phenyl sulfonate, tin phenol sulfonate and tin toluene sulfonate and tin alkanol sulfonate. Typically the tin compound is tin sulfate, tin chloride, tin alkane sulfonate or tin aryl sulfonate, and more typically tin sulfate or tin methane sulfonate. The amount of tin compound in these compositions is typically an amount that provides tin ion content in the range of 5 g/L to 150 g/L, more typically 30 g/L to 80 g/L. Mixtures of tin compounds may be used.

Any acidic electrolyte that is solution soluble, is suitable for producing a stable tin electrolyte, and does not otherwise adversely affect the electrolyte composition may be used. Suitable acidic electrolytes include, but are not limited to, alkane sulfonic acids, such as methane sulfonic acid, ethane sulfonic acid and propane sulfonic acid, aryl sulfonic acids, such as phenyl sulfonic acid, phenol sulfonic acid and toluene sulfonic acid, sulfuric acid, sulfamic acid, hydrochloric acid, hydrobromic acid, fluoroboric acid and mixtures thereof. Typically, the amount of acidic electrolyte is in the range of from 10 g/L to 400 g/L, more typically from 50 g/L to 400 g/L.

In tin alloy plating baths, one or more alloying metal compounds are used in addition to tin. Suitable alloying metals include, but are not limited to, lead, nickel, copper, bismuth, zinc, silver, antimony and indium. The useful alloying metal compounds are any which provide the metal to the electrolyte composition in a soluble form. Thus, the metal compounds include, but are not limited to, salts, such as metal halides, metal sulfates, metal alkane sulfonates, such as metal methane sulfonate, metal aryl sulfonates, such as metal phenyl sulfonate and metal toluene sulfonate and metal alkanol sulfonates. The choice of the alloying metal compound and the amount of such alloying metal compound present in the electrolyte composition depends, for example, upon the tin-alloy to be deposited, and is well known to those skilled in the art. Typical tin alloys are tin/copper, tin/bismuth, tin/silver, tin/zinc, tin/silver/copper and tin/silver/bismuth.

One or more other additives may be used in the tin or tin alloy electroplating baths, such as reducing agents, grain refiners such as hydroxy aromatic compounds and other wetting agents, brightening agents and antioxidants. Mixtures of additives may also be used.

Reducing agents may be added to the tin and tin-alloy electrolyte compositions to assist in keeping the tin in a soluble, divalent state. Suitable reducing agents include, but are not limited to, hydroquinone and hydroxylated aromatic compounds, such as resorcinol and catechol. Suitable reducing agents are those disclosed, for example, in U.S. Pat. No. 4,871,429. The amount of such reducing agent is typically from 0.1 g/L to 5 g/L.

Bright deposits may be obtained by adding brighteners to the tin and tin-alloy electrolyte compositions. Such brighteners are well known to those skilled in the art. Suitable brighteners include, but are not limited to, aromatic aldehydes such as naphthaldehyde. benzaldehyde, allylbenzaldehyde, methoxybenzaldehyde and chlorobenzaldehyde, derivatives of aromatic aldehydes, such as benzyl acetone and benzylidine acetone, aliphatic aldehydes, such as acetaldehyde or glutaraldehyde, and acids such as acrylic acid, methacrylic acid and picolinic acid. Typically, brighteners are used at an amount of 0.1 g/L to 3 g/L.

Suitable non-ionic surfactants or wetting agents include, but are not limited to, relatively low molecular weight ethylene oxide ("EO") derivatives of aliphatic alcohols containing one or more alkyl group of up to 7 carbons or ethylene oxide derivatives of aromatic alcohols having up to two aromatic rings, which may be fused and which may be substituted with an alkyl group having up to 6 carbons. The aliphatic alcohols may be saturated or unsaturated. The aromatic alcohols typically have up to 20 carbon atoms prior to derivatization with ethylene oxide. Such aliphatic and aromatic alcohols may be further substituted, for example, with sulfate or sulfonate groups. Typically, such non-ionic surfactants or wetting agents are added in an amount of 0.1 g/L to 50 g/L.

Hydroxy aromatic compounds or other wetting agents may be added to these electrolyte compositions to provide further grain refinement. Such grain refiners may be added to further improve deposit appearance and operating current density range. Suitable other wetting agents include, but are not limited to, alkoxylates, such as the polyethoxylated amines JEFFAMINE™ T-403 or TRITON™ RW, sulfated alkyl ethoxylates, such as TRITON™ QS-15, and gelatin or gelatin derivatives. The amounts of such grain refiners useful are well known to those skilled in the art and typically from 0.01 ml/L to 20 ml/L.

Optionally, an antioxidant compound can be employed in the electrolyte composition to minimize or prevent stannous tin oxidation from occurring, for example, from the divalent to tetravalent state. Suitable antioxidant compounds include, for example, dihydroxybenzene and multivalent compounds based on the elements of groups IV B, V B, and VI B in the Periodic Table of the Elements, such as those of vanadium, niobium, tantalum, titanium, zirconium and tungsten. Typically, such antioxidant compounds are present in the electrolyte composition in an amount of from 0 to 2 g/L.

Tin or tin alloy is plated at a temperature of from 20° C. to 60° C., typically from 35° C. to 45° C. When the tin or tin alloy is electroplated, the current density is typically from 0.5 ASD to 10 ASD.

One or more layers of silver are then deposited adjacent to the tin or tin alloy layer. The thickness of the silver layer to the tin or tin alloy layer is at least 2:1, preferably 2:1 to 30:1, more preferably 5:1 to 25:1. Typically the silver has a thickness of at least 0.02 μm, preferably from 0.02 μm to 60 μm, more preferably 0.5 μm to 25 μm. Silver may be deposited on the tin or tin alloy using conventional methods. Typically silver is deposited by electrolytic, electroless or immersion plating. Preferably silver is deposited by electrolytic plating.

Conventional electroplating silver compositions may be used. The silver compositions may be cyanide containing silver compositions or cyanide-free silver compositions. Preferably, the silver bath is a cyanide containing bath. Sources of silver ions may include, without limitation: silver potassium cyanide, silver nitrate, silver sodium thiosulfate, silver gluconate; silver-amino acid complexes such as silver-cysteine complexes; silver alkyl sulfonates, such as silver methane sulfonate. Mixtures of silver compounds may be used. The concentration of silver ions in the composition is typically in an amount of 2 g/L to 40 g/L. Such silver compounds are generally commercially available from a variety of sources, such as Aldrich Chemical Company, Milwaukee, Wis. Examples of commercially useful silver plating compositions are available as SILVER GLO™ 3K Silver Electroplating bath, SILVERJET™ 300 Silver Electroplating bath, SILVER GLEAM™ 360 Silver Electroplating bath, ENLIGHT™ Silver Plate 600 and 620 from Rohm and Haas Electronic Materials, LLC.

A wide variety of conventional surfactants may be used in the silver plating compositions, such as anionic, cationic, amphoteric and nonionic surfactants. Surfactants may be included in conventional amounts. The silver plating compositions may contain one or more additional conventional components. Such additional components include, without limitation, electrolytes, buffers, brighteners, grain refiners, chelating agents, complexing agents, reducing agents, levelers and ductility enhancers. Such additional components are well known in the art and are used in conventional amounts.

Silver plating compositions may have a pH in the range of 1 to 14, typically from 1 to 12, and still more typically from 1-8. The working temperature of the silver plating compositions during silver plating is from 10 to 100° C., or such as from 20 to 60° C. Typical current densities are from 0.1 ASD to 50 ASD, more typically from 1 ASD to 20 ASD.

Optionally, an anti-tarnish layer may be deposited on the silver layer. Conventional anti-tarnish compositions may be used. Commercial examples of such ant-tarnish materials are NO-TARN™ PM 3 Anti-tarnish formulation, PORE BLOCKER 100 Anti-tarnish formulation and PORE BLOCKER™ 200 Anti-tarnish formulation (available from Rohm and Haas Electronic Materials, LLC)

Silver layers at least twice the thickness of an adjacent film of tin or tin alloy adjacent nickel or nickel alloy inhibits oxidation of the nickel layer thus inhibiting adhesion failure between the silver and the substrate during high temperature applications. Intermetallics of nickel/tin form at the interface of the tin and nickel layers and intermetallics of tin/silver form at the interfaces of the tin and silver layers. While not being bound by theory, formation of tin/silver intermetallics may change the microstructure of the silver layer and prevent oxygen reaching the nickel or nickel alloy surface and formation of the nickel/tin intermetallics may increase oxidation resistance of the nickel or nickel alloy layer. Oxidation of nickel or nickel alloy layers may be measured using standard EDS or EDX analysis methods well known in the art. The articles may be used in high temperature environments with minimal concern for adhesion failure of the silver layer. In general, the articles may be used as parts or components in PCBs, electrical connectors, light emitting diodes (LEDs), electric vehicles and other applications where silver layers may be exposed to temperatures of 150° C. and higher.

The following examples are included to illustrate the invention but are not intended to limit the scope of the invention.

Example 1

Comparative

Three cleaned copper-based coupons (copper or copper/zinc) 2 cm×5 cm were placed into an aqueous nickel electroplating bath having the formula disclosed in Table 1.

TABLE 1

| COMPONENT | AMOUNT |
|---|---|
| Nickel ions as nickel sulfate hexahydrate | 60 g/L |
| Nickel ions as nickel chloride hexahydrate | 10 g/L |
| Boric acid | 45 g/L |
| Saccharine sodium salt | 0.5 g/L |
| Fatty alcohol sulfate ethoxylate | 2 ml/L |

The coupons were connected to a rectifier and the counter electrode was a platinised titanium electrode. The temperature of the nickel plating bath was maintained at 30° C. during nickel electroplating. The current density was 1 ASD. Electroplating was done until a layer of nickel 2 μm thick was deposited on each copper coupon. The coupons were removed from the plating bath and rinsed with deionized water at room temperature.

The coupons were then placed into an aqueous silver strike bath which included 2 g/L of silver cyanide as the source of silver ions and 100 g/L of potassium cyanide. The nickel plated copper coupons were connected to a rectifier. The counter electrode was a platinised titanium electrode. Silver electroplating was done at 60° C. with a current density of 0.1 ASD until a silver strike layer of 0.1 μm was deposited on the nickel.

The coupons were then placed into a silver electroplating bath which had the formulation disclosed in Table 2.

TABLE 2

| COMPONENT | AMOUNT |
|---|---|
| Silver ions as silver cyanide | 35 g/L |
| Potassium cyanide | 90 g/L |

TABLE 2-continued

| COMPONENT | AMOUNT |
|---|---|
| Potassium carbonate | 15 g/L |
| Selenium cyanide | 0.5 ppm |

The coupons were connected to a rectifier and the counter electrode was a platinised titanium electrode. The silver bath was maintained at a temperature of 60° C. The current density was 2ASD. Silver electroplating was done until a layer of silver 5 μm thick was deposited on the silver strike layer.

The silver plated coupons were removed from the silver electroplating bath and rinsed with deionized water and air dried at room temperature. Adhesion of the silver layers was then tested for each coupon using the standard cross-hatch and tape test. All test coupons showed good adhesion. No silver was observed on the tape after pulling the tape from the silver coated coupons.

The coupons were then stored at 200° C. for 1,000 hours in a conventional convection oven. Adhesion of the silver to the coupons was checked every 200 hours by allowing the coupons to cool to room temperature followed by cross-hatch and tape test. After 400 hours all of the coupons showed signs of poor silver adhesion. After 1000 hours the coupons were removed from the oven and allowed to cool to room temperature.

Figure 2:
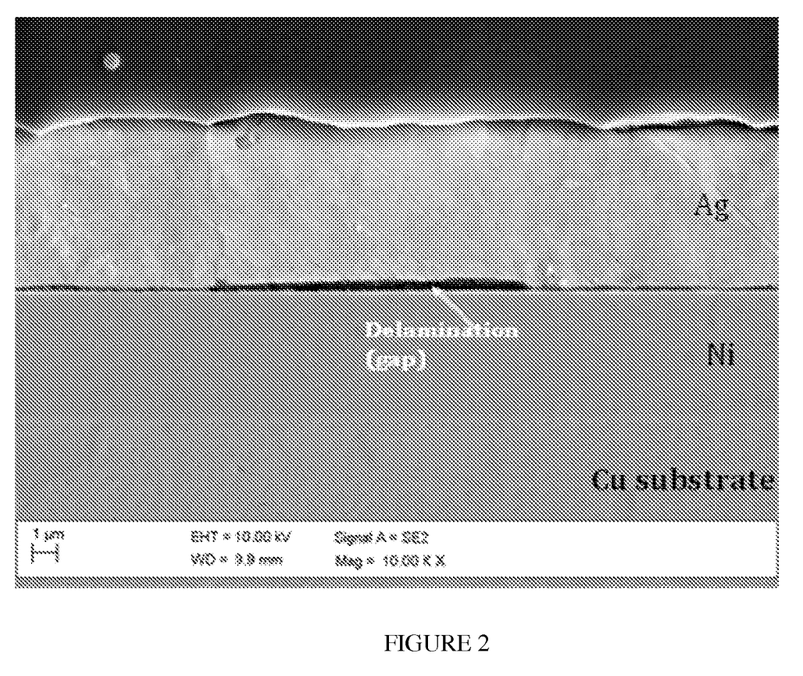
FIG. 2 is a 10,000×SEM cross-section of a silver layer on nickel showing gaps at the silver and nickel interface after 1000 hours of storage at 200° C.

A cross-section of each coupon was taken and examined under a SIGMA SEM scanning electron microscope equipped with an EDX from Zeiss. All of the SEMs showed gaps at the interface of the nickel and silver layers. FIG. 2 is a SEM of a cross-section of one of the copper coupons examined. The top potion of the SEM is embedding resin used to fix the sample for cross-section analysis. The electroplated silver layers are below the embedding resin and the gap formed during the high heat storage is seen at the interface of the silver layers and the nickel layer directly under the silver layers. The copper base material is directly under the nickel layer.

Example 2

Comparative

Three copper-based coupons were prepared as described in Example 1 above except that a gold strike layer was plated on the nickel layer instead of a silver strike layer. The aqueous gold strike bath had the formulation in Table 3.

TABLE 3

| COMPONENT | AMOUNT |
|---|---|
| Gold ions as potassium gold cyanide | 2 g/L |
| Cobalt ions as cobalt carbonate | 0.5 g/L |
| Tripotassium citrate | 50 g/L |

The gold strike bath was maintained at a temperature of 40° C. at a current density of 0.2 ASD. Gold electroplating was done until a layer of gold 0.1 μm thick was deposited on the nickel layer.

Each coupon was then electroplated with a silver layer 5 μm thick using the silver cyanide bath disclosed in Table 2 above. The same silver plating conditions were used as in Example 1.

The silver plated coupons were removed from the silver electroplating bath and rinsed with deionized water and air dried at room temperature. Adhesion of the silver layers was then tested for each coupon using the standard cross-hatch and tape test. All test coupons showed good adhesion. No silver was observed on the tape after pulling the tape from the silver coated coupons.

The coupons were then stored at 200° C. for 1,000 hours in a conventional convection oven. Adhesion of the silver to the coupons was checked every 200 hours. After 400 hours all of the coupons showed signs of poor silver adhesion. After 1000 hours the coupons were removed from the oven and allowed to cool to room temperature.

Figure 3:
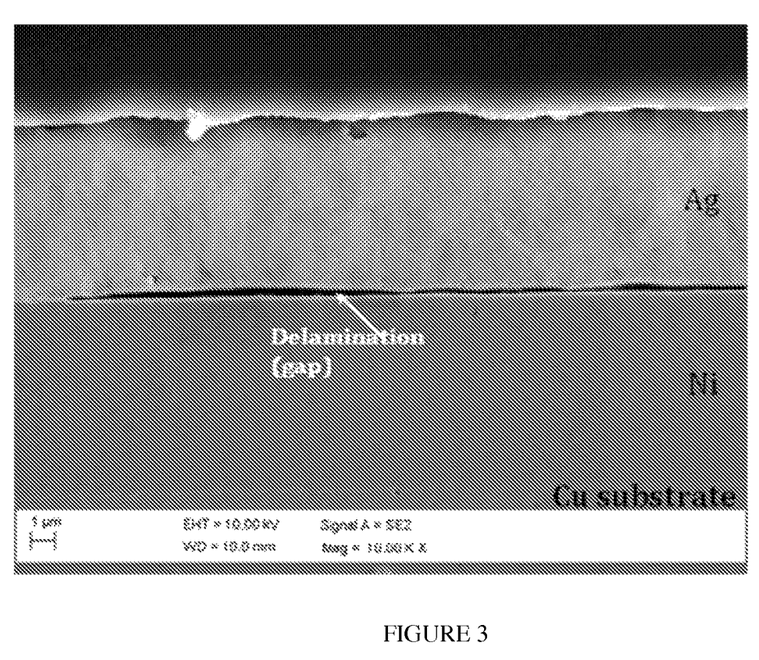
FIG. 3, is a 10,000×SEM cross-section of a silver layer on nickel with a gold strike layer between the silver and nickel showing gaps at the gold strike and nickel interface after 1000 hours of storage at 200° C.

A cross-section of each coupon was taken and examined under a scanning electron microscope. All of the SEMs showed gaps at the interface of the nickel and gold strike layers. FIG. 3 is a SEM of a cross-section of one of the coupons examined. The SEM shows delamination between the silver layer and the nickel layer during the high heat storage.

Example 3

Comparative

Three copper-based coupons were prepared as described in Example 1 above except that a palladium and nickel alloy strike layer was plated on the nickel layer instead of a silver strike layer. The aqueous palladium and nickel alloy strike bath had the formulation in Table 4.

TABLE 4

| COMPONENT | AMOUNT |
| --- | --- |
| Palladium as palladium tetramine sulfate | 20 g/L |
| Nickel as nickel sulfate | 8 g/L |
| Ammonium hydroxide | 50 g/L |

The palladium and nickel alloy strike bath was maintained at a temperature of 60° C. at a current density of 0.2 ASD. Palladium and nickel alloy electroplating was done until a layer of the alloy 0.1 μm thick was deposited on the nickel layer.

Each coupon was then electroplated with a silver layer 5 μm thick using the silver cyanide bath disclosed in Table 2 above. The same silver plating conditions were used as in Example 1.

The silver plated coupons were removed from the silver electroplating bath and rinsed with deionized water and air dried at room temperature. Adhesion of the silver layers was then tested for each coupon using the standard cross-hatch and tape test. All test coupons showed good adhesion. No silver was observed on the tape after pulling the tape from the silver coated coupons.

The coupons were then stored at 200° C. for 1,000 hours in a conventional convection oven. Adhesion of the silver to the coupons was checked every 200 hours. After 400 hours all of the coupons showed signs of poor silver adhesion. After 1000 hours the coupons were removed from the oven and allowed to cool to room temperature.

Figure 4:
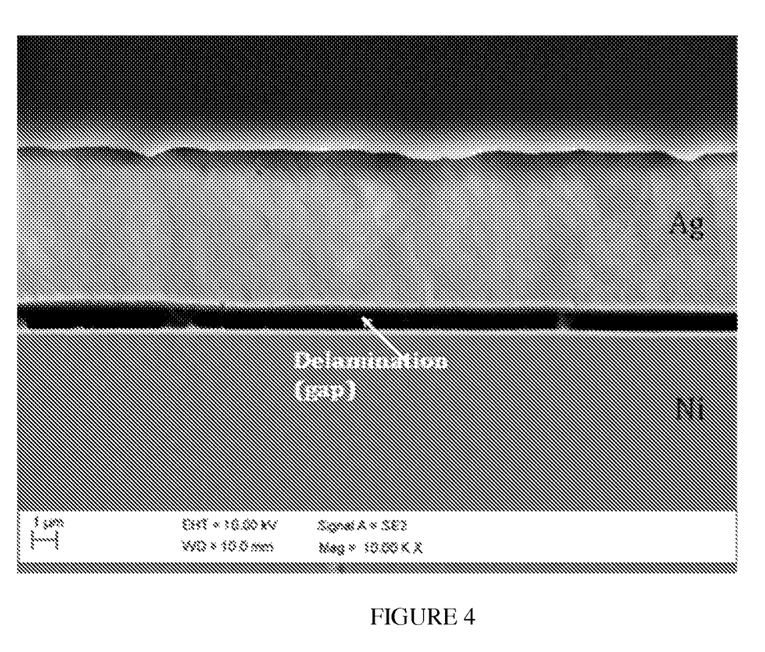
FIG. 4, is a 10,000×SEM cross-section of a silver deposit on nickel with a palladium/nickel alloy strike layer between the silver and nickel showing gaps at the palladium/nickel alloy and nickel interface after 1000 hours of storage at 200° C.

A cross-section of each coupon was taken and examined under a scanning electron microscope. All of the SEMs showed gaps at the interface of the nickel and palladium and nickel strike layers. FIG. 4 is a SEM of a cross-section of one of the copper coupons examined (copper base not shown in this Figure). The SEM shows delamination between the silver layer and the nickel layer during the high heat storage.

Example 4

Three copper-based coupons were prepared as described in Example 1 above except that a tin strike layer was plated on the nickel layer instead of a silver strike layer. The aqueous tin strike bath had the formulation in Table 5.

TABLE 5

| COMPONENT | AMOUNT |
| --- | --- |
| Tin ions as tin methane sulfonate | 60 g/L |
| Methane sulfonic acid | 150 ml/L |
| EO/PO copolymer[1] | 2 ml/L |
| Hydroquinone | 1 g/L |

[1]TERGITOL ™ L62 Nonionic Surfactant (available from the Dow Chemical Company)

The tin strike bath was maintained at a temperature of 60° C. at a current density of 0.1 ASD. Tin electroplating was done until a layer of tin 0.2 μm thick was deposited on the nickel layer.

Each coupon was then electroplated with a silver layer 5 μm thick using the silver cyanide bath disclosed in Table 2 above. The same silver plating conditions were used as in Example 1.

The silver plated coupons were removed from the silver electroplating bath and rinsed with deionized water and air dried at room temperature. Adhesion of the silver layers was then tested for each coupon using the standard cross-hatch and tape test. All test coupons showed good adhesion. No silver was observed on the tape after pulling the tape from the silver coated coupons.

The coupons were then stored at 200° C. for 1,000 hours in a conventional convection oven. Adhesion of the silver to the coupons was checked every 200 hours. There was no observable evidence of any adhesion failure between the silver layers and the coupons at any of the 200 hour intervals. After 1000 hours the coupons were removed from the oven and allowed to cool to room temperature. Adhesion of the silver layers was then tested for each coupon using the standard cross-hatch and tape test. There was no indication of adhesion failure between the silver and nickel layers. All of the test coupons had good adhesion.

Figure 5:
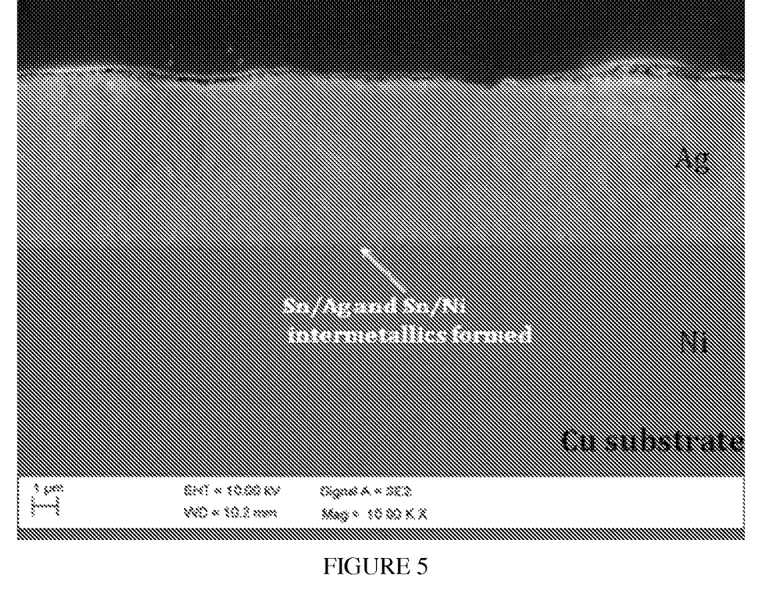
FIG. 5, is a 10,000×SEM cross-section of a silver deposit on nickel with Sn/Ag and Sn/Ni intermetallics between the silver and nickel and without any observable gaps at the interfaces of the layers after 1000 hours of storage at 200° C.

A cross-section of each coupon was taken and examined under a scanning electron microscope. No observable gaps at the interfaces of the metal layers were seen on any of the SEMs. FIG. 5 is a SEM of a cross-section of one of the copper coupons examined No delamination between the silver and the nickel was observed on the SEM. Intermetallic compounds of nickel and tin, and tin and silver formed at the interface between the silver and the nickel layers.

What is claimed is:

1. An article comprising a substrate comprising copper or copper alloy adjacent to the substrate, a nickel layer adjacent the copper or copper alloy adjacent to the substrate, a tin layer adjacent the nickel layer and a silver layer adjacent the tin layer, the silver layer thickness to the tin layer thickness is 5:1 to 25:1.

2. The article of claim 1, wherein the tin layer is 0.1-1 μm thick.

3. The article of claim 1, wherein the silver layer is 0.5-25 μm thick.

4. The article of claim 1, wherein the article comprises a nickel and tin intermetallic, and a tin and silver intermetallic.

5. The article of claim 1, wherein the article is a component of an electrical connector, printed circuit board, light emitting diode, or electric vehicle.

* * * * *